United States Patent [19]
Matthews et al.

[11] Patent Number: 6,023,021
[45] Date of Patent: Feb. 8, 2000

[54] REINFORCED THERMOPLASTIC ELASTOMER WALL PLATE WITH CAPTIVE SCREW

[75] Inventors: Daniel M. Matthews, Charlotte, N.C.; George Dean Pournaras, Liverpool, N.Y.; James H. Todd, Jr., Concord, N.C.; James A. Osterbrock, Central Square, N.Y.; Richard M. Rohmer, Jordan, N.Y.; Michael P. Zaferakis, Liverpool, N.Y.

[73] Assignee: Pass & Seymour, Inc., Solvay, N.Y.

[21] Appl. No.: 09/232,506

[22] Filed: Jan. 15, 1999

[51] Int. Cl.[7] .............................. H02G 3/14; H05K 5/03
[52] U.S. Cl. ............................................. 174/66; 220/241
[58] Field of Search .......................... 174/66; 220/241, 220/3.8; D8/353; D13/177

[56] References Cited

U.S. PATENT DOCUMENTS

| | | | |
|---|---|---|---|
| 801,536 | 10/1905 | Marshall | 220/241 |
| 1,726,429 | 8/1929 | Ferris | 174/66 X |
| 1,726,430 | 8/1929 | Ferris | 174/66 X |
| 2,428,167 | 9/1947 | Linton | 220/241 X |
| 2,575,820 | 11/1951 | Linton | 220/241 X |
| 2,740,873 | 4/1956 | Cronk | 174/66 X |
| 3,438,534 | 4/1969 | Zerwes | 220/241 |
| 3,840,692 | 10/1974 | Wells | 174/66 |
| 5,524,330 | 6/1996 | Alberini | 174/66 X |
| 5,710,392 | 1/1998 | Bordwell et al. | 220/3.8 X |
| 5,753,858 | 5/1998 | Eder et al. | 174/66 X |

Primary Examiner—Dean A. Reichard
Attorney, Agent, or Firm—Harter, Secrest & Emery LLP; Stephen B. Salai

[57] ABSTRACT

A reinforced thermoplastic elastomer wall plate having a mounting hole and a mounting screw retained in the opening by a web, and a packaging system for the wall plate which includes a flexible wrap and a reinforcing fin seal overlaying the screw are described.

5 Claims, 6 Drawing Sheets

REINFORCED THERMOPLASTIC ELASTOMER WALL PLATE WITH CAPTIVE SCREW

FIELD OF THE INVENTION

This invention relates generally to wall plates for electrical devices, and more particularly to an improved wall plate made from unbreakable thermoplastic material and a new packaging system therefor.

BACKGROUND OF THE INVENTION

For many years, wall plates for electrical devices, such as switches, receptacles, and the like, have been made from thermosetting materials, such as urea and urea-formaldehyde resins and the like. These materials are inexpensive and relatively easy to mold into wall plates, but have the disadvantage of being quite brittle and requiring the use of manufacturing methods that produce environmentally unfriendly by-products that are difficult and/or expensive to dispose of.

A relatively small number of wall plates has been manufactured from thermoplastic material. Thermoplastic materials are less brittle than thermosetting materials and can be produced by manufacturing methods that are cleaner than those required for the manufacture of thermosetting materials. However, thermoplastic materials, while strong, are not nearly as rigid as thermosetting materials of the same thickness, and there has been some resistance to the use of thermoplastic wall plates because they, although unbreakable, have a greater flexibility than wall plates made from thermosetting material, and therefore appear less sturdy to customers.

It is known to provide wall plates with openings for receiving mounting screws having webs therein for holding the mounting screws during assembly. However, it has been the universal practice to sell such wall plates with the mounting screws separately packaged, for example in a separate plastic envelope, included along with the wall plate. This increases the cost of packaging, and also the difficulty of installing the wall plate since the screws must be removed from the separate package, manually inserted into the opening, and subsequently tightened to fix the wall plate in position.

It is an object of this invention to provide an improved wall plate that overcomes one or more of the foregoing disadvantages of wall plates heretofore known.

More particularly, it is an object of this invention to provide a wall plate fabricated from thermoplastic materials that is more rigid than those heretofore known.

It is another object of this invention to provide a wall plate made from thermoplastic materials that has an array of reinforcing ribs on a rear surface of the wall plate that at once stiffen the wall plate and also provide a desirable rigid appearance to consumers, thereby influencing the purchasing decision.

It is still a further object of this invention to provide a thermoplastic wall plate having a screw opening with screw retaining webs therein in a package in which a screw is disposed within the opening, held captive by the web at the time of sale to eliminate the need for separate packaging of the screws, and to greatly simplify installation of the wall plate.

Briefly stated, and in accordance with a presently preferred embodiment of the invention, a reinforced thermoplastic wall plate with captive screw comprises a generally rectangular body of thermoplastic material having a smooth surface on a front side, a raised peripheral rim on an opposite rear side, a plurality of reinforcing ribs extending outwardly from the surface of the wall plate on the rear side extended to a height no greater than the height of the raised peripheral rim, a mounting screw opening extending from the front side to the back side, a web within the mounting screw opening, and a screw retained in the opening by the web, a thread of the screw being engaged by an edge of the web.

In accordance with another aspect of this invention, a reinforced thermoplastic wall plate comprises a body formed from nylon.

SUMMARY OF THE INVENTION

The present invention is a wall plate for an electrical device comprising a generally rectangular body of thermoplastic material; a plurality of reinforcing ribs extending outwardly from a rear surface of the rectangular body by a first distance; and a raised peripheral rim on the rear surface of the body extending at least said first distance.

BRIEF DESCRIPTION OF THE DRAWINGS

While the invention is described with particularity in the appended claims, these and further objects and advantages of the invention may be more readily comprehended by reference to the following detailed description of a presently preferred embodiment of the invention taken in conjunction with the accompanying drawings, in which:

DETAILED DESCRIPTION OF A PREFERRED EMBODIMENT OF THE INVENTION

Figure 1:
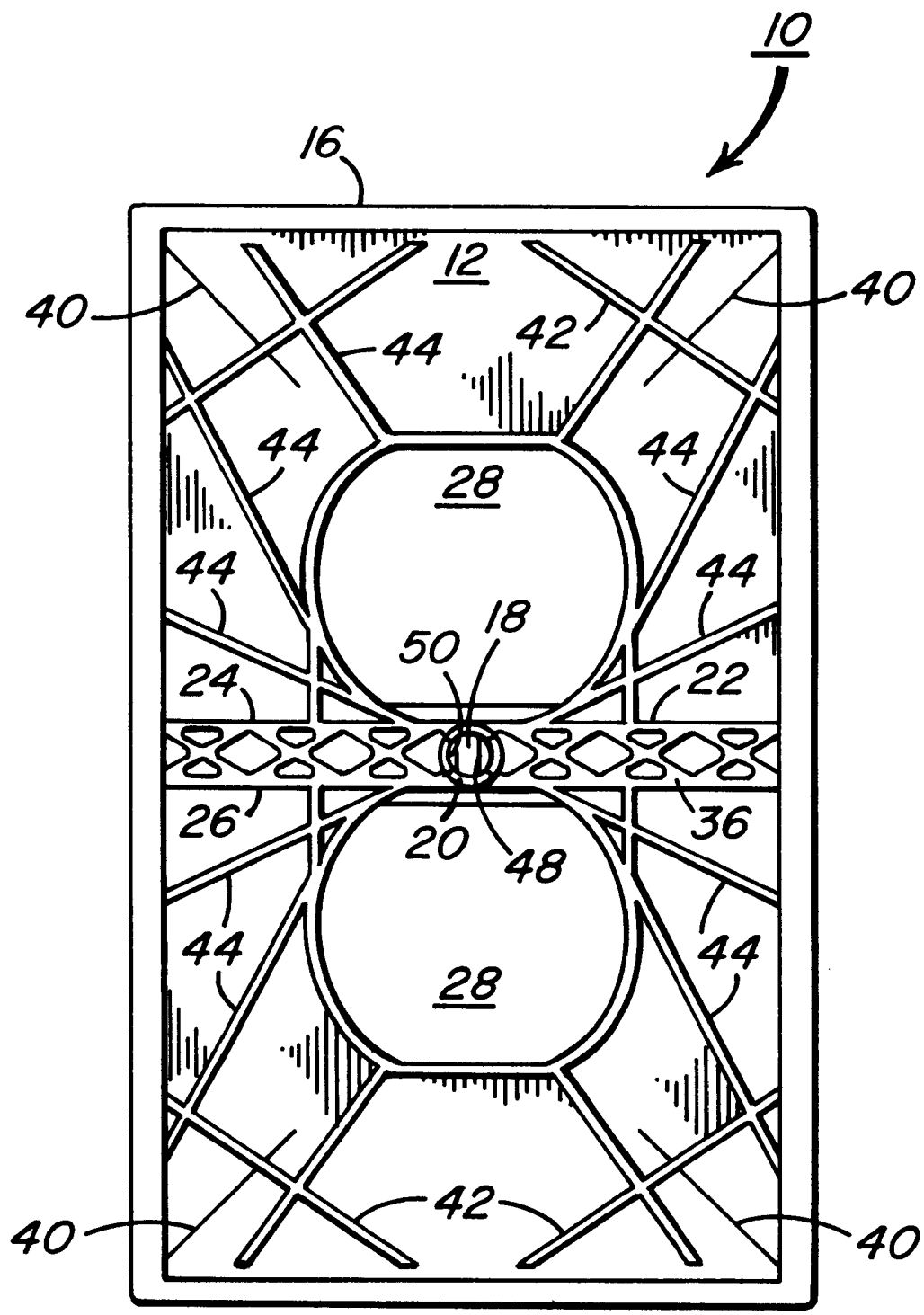
FIG. 1 is a rear view of a thermoplastic wall plate having a plurality of reinforcing ribs in accordance with this invention.
Figure 2:
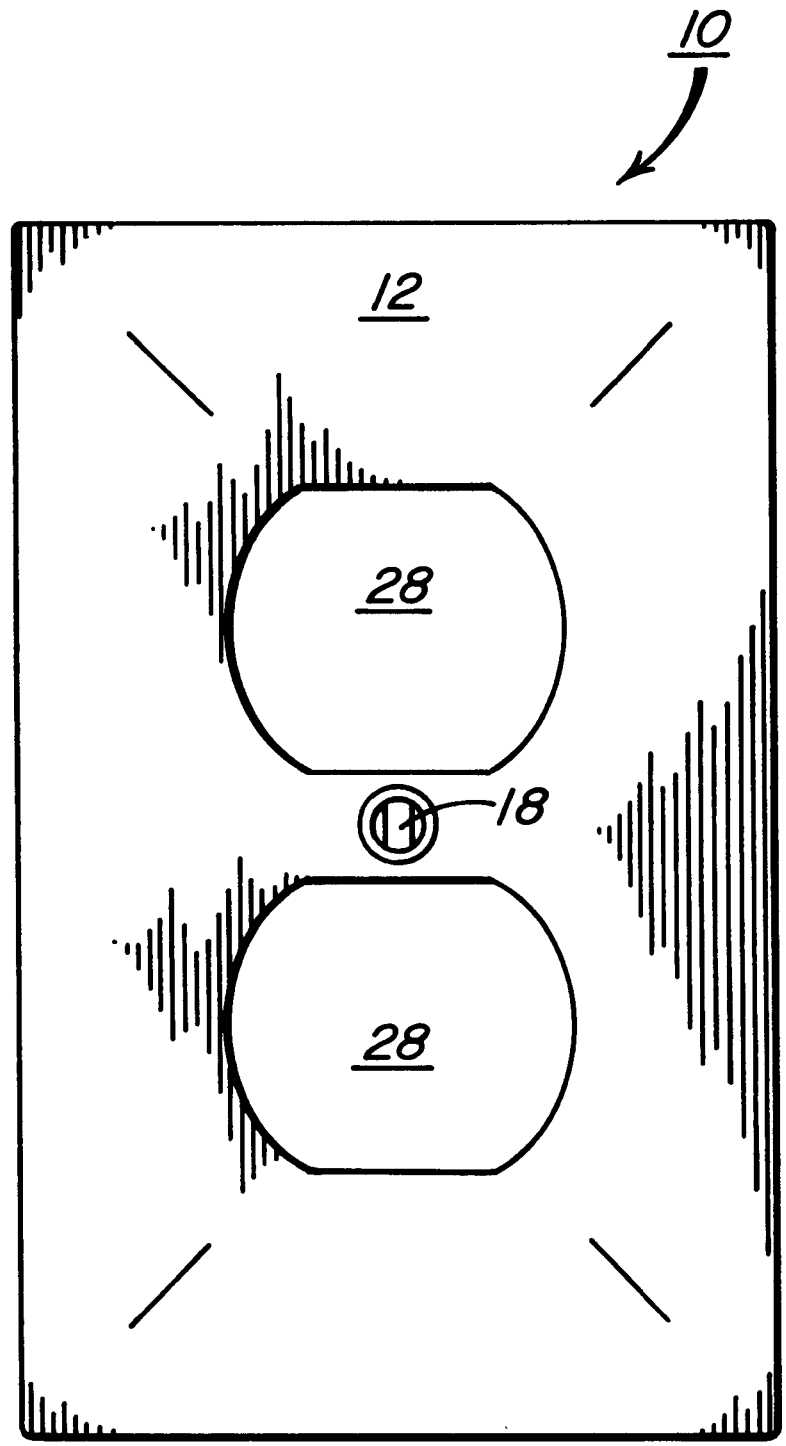
FIG. 2 is a front view of a thermoplastic wall plate.

Referring now to FIGS. 1, 2, and 5–9, a reinforced wall plate 10 in accordance with this invention comprises a generally rectangular sheet of thermoplastic material, such as nylon or polycarbonate having overall dimensions sufficient to cover an opening in which a device, such as a duplex receptacle, switch or the like is mounted. The wall plate 10 is provided with one or more openings 28 therein for providing access to the receptacle or switch. One or more mounting screw openings 18 is provided extending through the body of the wall plate 10, to allow the wall plate 10 to be fastened to the wall, junction box, or electrical device, as the particular application requires.

The wall plate of this invention is preferably formed from a thermoplastic material that can be manufactured by an environmentally friendly process, such as injection molding, that does not require the use of or produce toxic materials as by-products. The preferred material is nylon, specifically, nylon 6 (polyamide or polyamide 6). Material such as nylon 6/6, polycarbonate, PVC, ABS, PPO, or blends of materials such as PC/ABS, may be used. The selection criteria included rigidity, cost, flammability, chemical resistance, ultraviolet light stability, non-breakability, moisture absorption, and relaxation and deformation under elevated temperature. A wall plate made of nylon 6 was determined to best satisfy the criteria. The wall plate made from nylon 6 also received the most positive market feedback.

The wall plates of this invention are preferably made in a multi-cavity injection mold.

Figure 3:
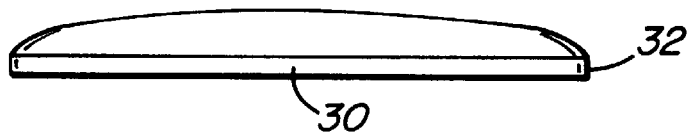
FIG. 3 is a top view of the plate, the bottom view being a mirror image.
Figure 4:
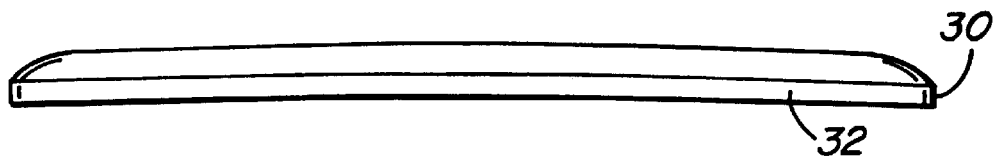
FIG. 4 is a right side view of the plate, the left side view being a mirror image.
Figure 5:
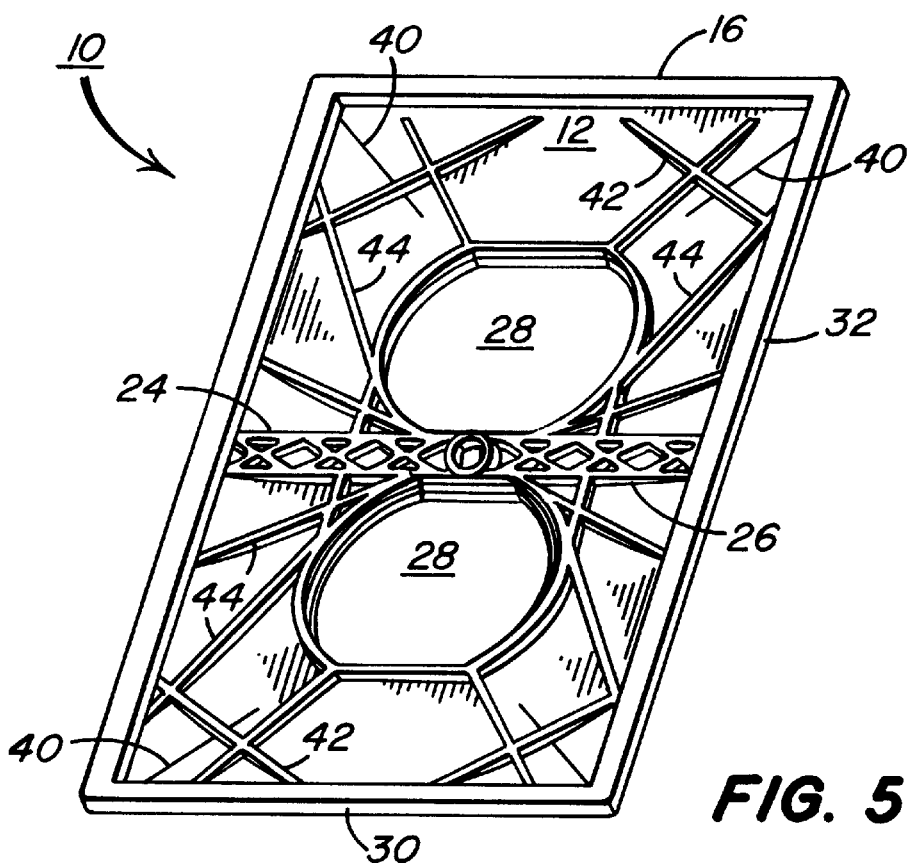
FIG. 5 is a perspective view of the bottom right side of the wall plate.

The wall plate 10 of this invention has a peripheral rim 16 of slightly greater height than the remainder of the wall plate 10 and provides some stiffness. Preferably, as best shown in FIGS. 3 and 4, the wall plate 10 is formed with a precurved configuration, such that when the wall plate 10 is placed on a flat surface, the centers of the long edges 32 are slightly raised from the surface relative to the short edges 30.

As shown in FIG. 1, the wall plate 10 is reinforced with a plurality of ribs 40 extending from the rear surface away from the wall plate 10 in the same direction as the raised edge or rim 16, but no further than the raised edge. This allows the wall plate 10 to be mounted flush to a wall with a minimum discernible gap. The curved configuration of the wall plate 10 assists in this by insuring that the short edges will lie flush against the wall, while the long edges are drawn into contact with the wall when the wall plate is secured into position by one or more mounting screws 46. The reinforcing ribs include a central laterally extending central reinforcing beam 22 formed from first 24 and second 26 long ribs extending from edge to edge, and a plurality of short diagonally oriented ribs 36 extending in a cross hatch pattern between the elongated ribs 24, 26. Preferably, a center mounting hole 18, if present, is disposed within the central reinforcing beam structure 22.

A plurality of radially extending ribs 44 is disposed between the central reinforcing beam structure 22 and the edges or rim 16 of the wall plate. Preferably, at least a plurality of these ribs 44 is arranged tangentially to contact one or more openings 28 in the wall plate 10, through which access can be gained to a switch lever, duplex receptacle, or the like. Still further, a plurality of ribs 42 is provided that extends between adjacent edges of the wall plate 10, to complete the reinforcing structure.

The reinforcing structure of the wall plate shown in FIG. 1 both provides the requisite stiffness for allowing the wall plate to pass industry standard peel and deflection tests, and also provides the aesthetic appearance of rigidity that is important to consumers at the point of sale. The wall plate is as strong as it appears.

Figure 6:
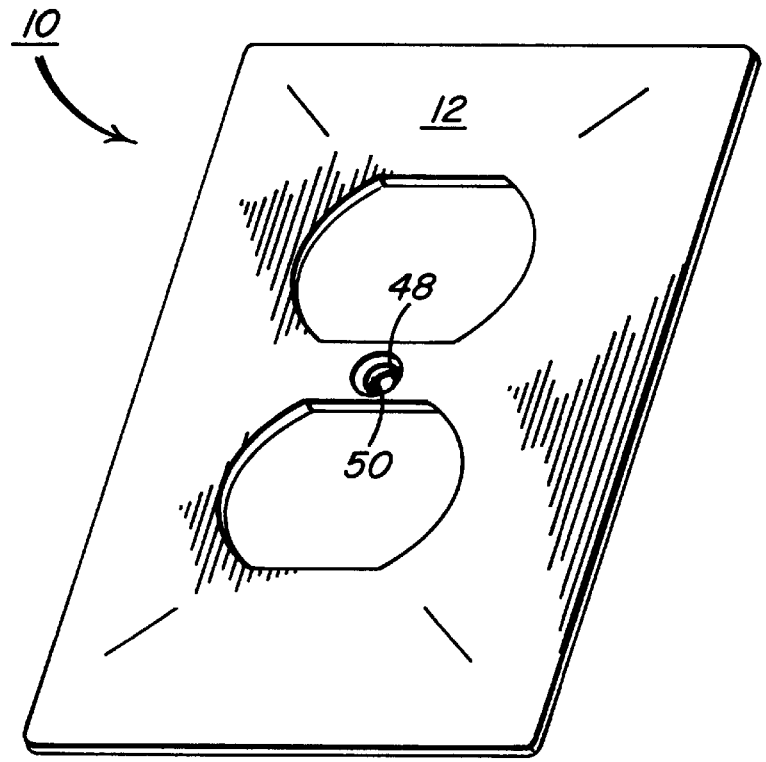
FIG. 6 is a perspective view from the top right side of the wall plate.
Figure 7:
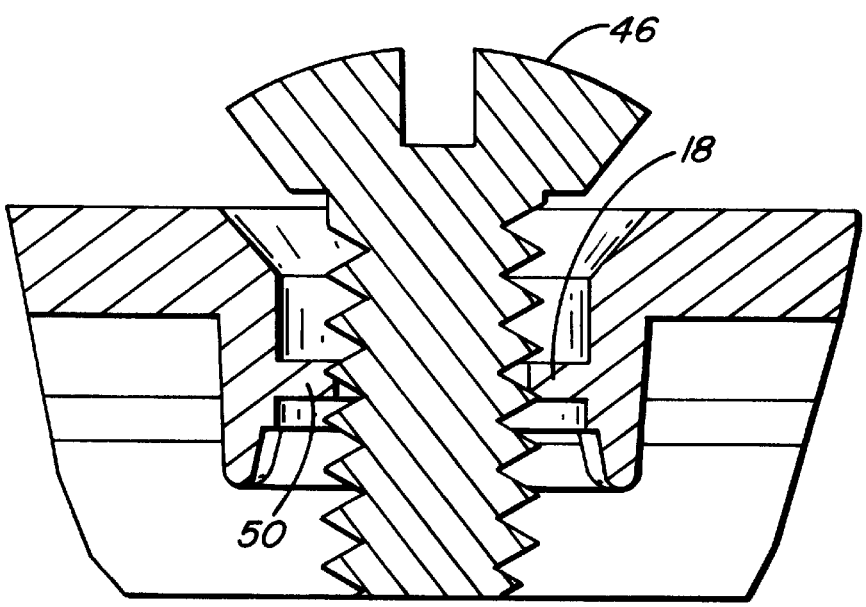
FIG. 7 is a cut away sectional view along line A—A of FIG. 8 of the wall plate with the screw within the wall plate.
Figure 8:
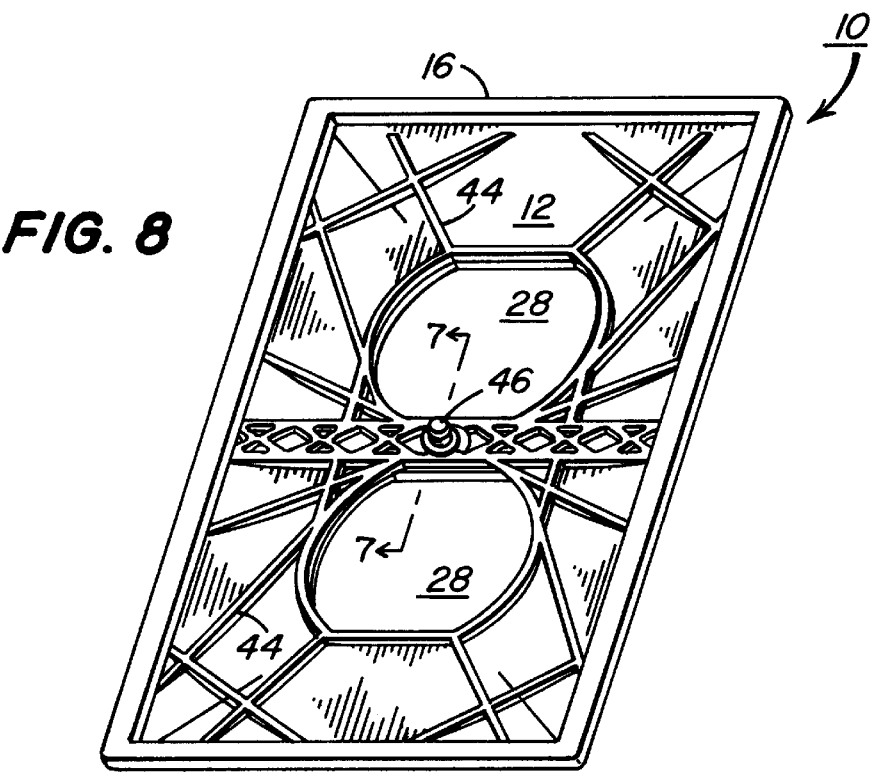
FIG. 8 is a perspective view from the bottom right side view of the wall plate with the fastener in place.
Figure 9:
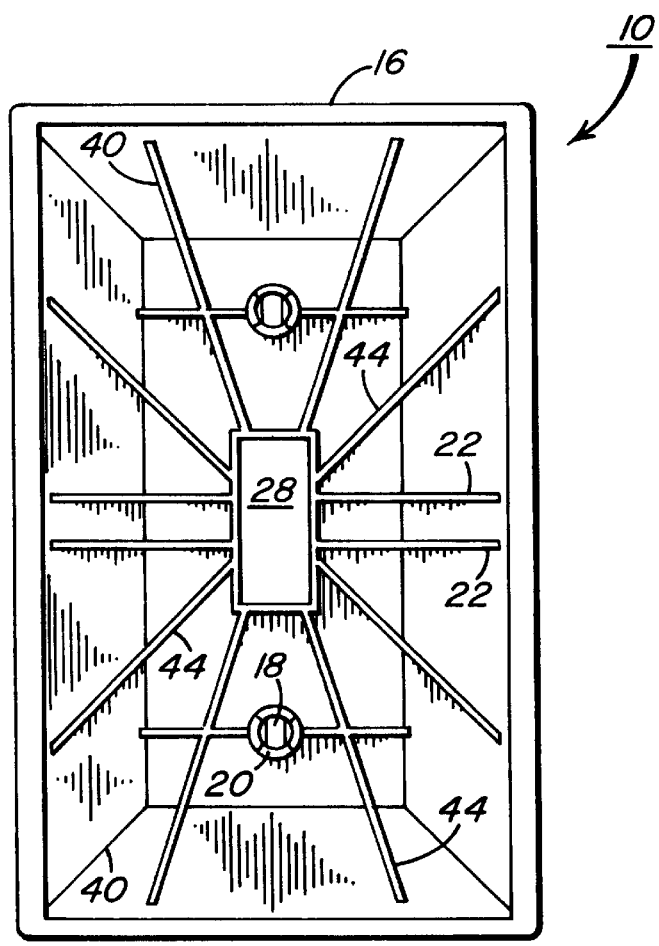
FIG. 9 is an alternative embodiment of the wall plate.

One or more mounting screw receiving holes 18 is provided in the wall plate 10. The mounting screw receiving holes 18 are preferably of a diameter slightly larger than the outside diameter of the threads of the fastener or mounting screws 46. As shown in FIGS. 6 and 7, at least one, preferably two webs 48 and 50, are provided within the mounting holes 18 for engaging the threads of a mounting screw 46 to hold the mounting screw 46 in position when the wall plate 10 is detached from the wall.

Figure 10:
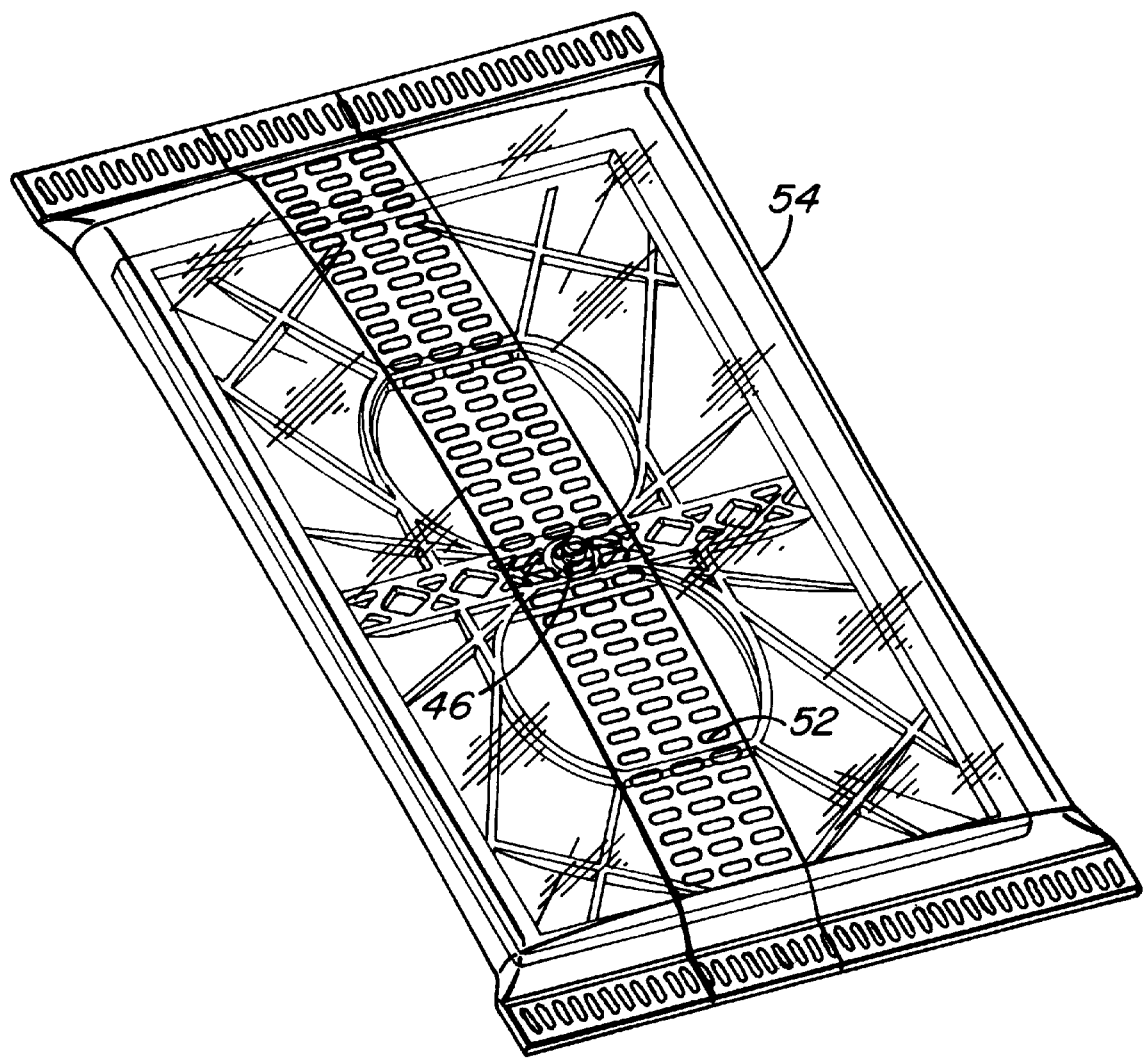
FIG. 10 is a drawing of a reinforced wall plate with a captive screw in accordance with this invention packaged within a sealed polypropylene container.

The reinforced thermoplastic mounting plate 10 of this invention is shown in a preferred package in FIG. 10. The package 54 is preferably formed from a continuous web of plastic, polyethylene, polypropylene or similar material, that is folded into a sleeve around the wall plate, and sealed longitudinally along what is referred to in the industry as a fin seal 52, and transversely along the short edges 30 of the wall plate 10 to form a closed package 54. Preferably, in accordance with this invention, one or more mounting screws 46 is inserted into the mounting screw receiving holes 18 in the wall plate 10 before the plastic package is wrapped around the wall plate 10. This eliminates the need for providing a separate package to hold the mounting screws during shipment and sale, and greatly simplifies the installation of the wall plate, since it is not necessary to open the package to remove the screws, place the screws in the hole, and finally secure the wall plate to the electrical device by tightening the screws. Heretofore, it has been necessary both to separately package the screws in a plastic package, and insert that plastic package into the packaging for the wall plate before the wall plate sleeve was sealed. This was a time consuming and expensive operation, and produced an inferior overall package.

Preferably, the polypropylene package for the wall plate of this invention is arranged with the fin seal 52 on the back of the package 54, positioned at approximately the center of the wall plate to engage the tip of the screw 46, to provide additional strength to prevent the screw from puncturing the package. This provides the additional advantage of allowing instructions, promotional material or the like, to be placed on the front of the package unobstructed by the fin seal.

The face of the wall plate may be processed to provide a non-smooth or non-glossy texture.

While the invention has been described in connection with a presently preferred embodiment thereof, those skilled in the art will recognize that many modifications and changes may be made therein, without departing from the true spirit and scope of the invention, which accordingly are intended to be defined solely by the appended claims.

What is claimed:

1. A wall plate for an electrical device, comprising:
 (a) a generally rectangular body of thermoplastic material;
 (b) a lateral reinforcing beam including first and second spaced apart parallel reinforcing ridges extending between first and second long sides of the wall plate; and
 (c) a plurality of diagonal reinforcing ridges extending in a cross hatched pattern between the first and second elongated ridges.

2. The wall plate of claim 1, having first and second short edges, and first and second long edges, in which the short edges comprise parallel straight lines, and the long edges comprise parallel curved lines.

3. The wall plate of claim 1, further comprising a plurality of radially extending reinforcing ridges extending from the reinforcing beam to the edges of the wall plate.

4. The wall plate of claim 3, in which at least some of the radial reinforcing ridges are tangential to one or more openings in the wall plate.

5. A wall plate for an electrical device comprising:
 (a) a generally rectangular body of thermoplastic material;
 (b) a mounting screw receiving hole in the body;
 (c) a web of material partly closing the mounting screw receiving hole;
 (d) a mounting screw retained in the mounting screw receiving hole by the web; and
 (e) a closed plastic package surrounding the wall plate and the screw;
 wherein the closed plastic package includes a fin seal joining edges of a plastic film, from which the package is made;

said fin seal disposed in alignment with a tip of the mounting screw, to reinforce the package against puncture by the mounting screw.

\* \* \* \* \*